(12) United States Patent
Gratton et al.

(10) Patent No.: US 8,666,574 B2
(45) Date of Patent: Mar. 4, 2014

(54) IN-VEHICLE ESTIMATION OF ELECTRIC TRACTION MOTOR PERFORMANCE

(75) Inventors: Michael R. Gratton, Dubuque, IA (US); Eric R. Anderson, Ames, IA (US); Zimin W. Vilar, Dubuque, IA (US)

(73) Assignee: Deere & Company, Moline, IL (US)

( * ) Notice: Subject to any disclaimer, the term of this patent is extended or adjusted under 35 U.S.C. 154(b) by 225 days.

(21) Appl. No.: 13/091,613

(22) Filed: Apr. 21, 2011

(65) Prior Publication Data
US 2012/0271493 A1 Oct. 25, 2012

(51) Int. Cl.
*B60L 15/20* (2006.01)

(52) U.S. Cl.
USPC .......................................................... 701/22

(58) Field of Classification Search
USPC .......................................................... 701/22
See application file for complete search history.

(56) References Cited

U.S. PATENT DOCUMENTS

| | | | | |
|---|---|---|---|---|
| 4,169,371 A | * | 10/1979 | Witschi et al. ............ | 73/114.13 |
| 4,330,739 A | * | 5/1982 | Chiang ...................... | 318/696 |
| 5,251,768 A | * | 10/1993 | Yoshimatsu et al. ......... | 212/277 |
| 5,493,798 A | * | 2/1996 | Rocke et al. ................ | 37/348 |
| 6,140,789 A | * | 10/2000 | Kachi et al. ................. | 318/603 |
| 6,199,018 B1 | * | 3/2001 | Quist et al. .................. | 702/34 |
| 6,274,998 B1 | * | 8/2001 | Kaneko et al. .............. | 318/802 |
| 6,279,931 B1 | * | 8/2001 | Kopczynski ............ | 280/124.111 |
| 6,428,442 B1 | * | 8/2002 | Turgay et al. .............. | 475/321 |
| 6,553,278 B2 | * | 4/2003 | Handroos et al. .......... | 700/213 |
| 7,075,260 B2 | * | 7/2006 | Maeda ....................... | 318/443 |
| 7,083,544 B2 | * | 8/2006 | Goransson et al. ......... | 477/3 |
| 7,603,918 B2 | * | 10/2009 | Blackwood et al. ........ | 73/862.23 |
| 7,694,588 B2 | * | 4/2010 | Stehlin et al. ............. | 73/862.322 |
| 7,853,384 B2 | * | 12/2010 | Johnson et al. ............. | 701/50 |
| 7,960,928 B2 | * | 6/2011 | Tang ........................ | 318/400.09 |
| 8,036,797 B2 | * | 10/2011 | Johnson et al. ............. | 701/50 |
| 8,092,339 B2 | * | 1/2012 | Heap et al. ................ | 477/5 |
| 8,129,933 B2 | * | 3/2012 | Maeda ....................... | 318/443 |
| 8,339,083 B2 | * | 12/2012 | Maeda ....................... | 318/443 |
| 2001/0056319 A1 | * | 12/2001 | Rocke ........................ | 701/50 |
| 2004/0169482 A1 | * | 9/2004 | Maeda ....................... | 318/443 |
| 2004/0200654 A1 | * | 10/2004 | Hatsuda et al. ............ | 180/243 |
| 2006/0186749 A1 | * | 8/2006 | Strydom .................... | 310/103 |
| 2006/0192512 A1 | * | 8/2006 | Maeda ....................... | 318/432 |
| 2007/0251742 A1 | * | 11/2007 | Adams et al. .............. | 180/65.2 |
| 2008/0234902 A1 | * | 9/2008 | Johnson et al. ............. | 701/50 |
| 2008/0295504 A1 | * | 12/2008 | Vigholm et al. ............ | 60/327 |
| 2009/0118936 A1 | * | 5/2009 | Heap et al. ................ | 701/54 |
| 2011/0172901 A1 | * | 7/2011 | Okumoto et al. ........... | 701/113 |
| 2011/0225442 A1 | * | 9/2011 | Benecke et al. ........... | 713/340 |
| 2012/0203397 A1 | * | 8/2012 | Michelis et al. ............ | 701/1 |
| 2012/0221222 A1 | * | 8/2012 | Anderson et al. .......... | 701/90 |
| 2013/0015658 A1 | * | 1/2013 | Vath et al. .................. | 290/7 |

* cited by examiner

*Primary Examiner* — John R Olszewski
*Assistant Examiner* — Jean-Paul Cass
(74) *Attorney, Agent, or Firm* — Faegre Baker Daniels LLP (57) ABSTRACT

A vehicle is provided having an electric motor and a controller configured to control the electric motor. The controller may calculate the torque output of the motor based on the acceleration and deceleration rates of the motor. Moments of inertia for components rotationally coupled to the motor may be employed in the torque calculation.

20 Claims, 4 Drawing Sheets

IN-VEHICLE ESTIMATION OF ELECTRIC TRACTION MOTOR PERFORMANCE

FIELD

The present disclosure relates to motor performance diagnostics, and more particularly to a system and method for estimating output performance of an electric traction motor of a vehicle.

BACKGROUND

In some combustion engine vehicles, an operator may perform a diagnostic procedure for detecting the drive train power output. For example, in a vehicle with a torque converter transmission, a stall test may be performed to estimate the power output of an internal combustion engine. The stall test may include placing the transmission in gear, commanding full engine fueling while resisting vehicle motion with a brake, and observing the resultant engine speed. A resulting engine speed lower than a design specification may be indicative of low engine power. In an electric vehicle, a method is needed for diagnosing the power output performance of a traction motor.

SUMMARY

According to an embodiment of the present disclosure, a method of diagnosing motor performance of a vehicle is provided. The method includes the steps of providing a vehicle including a chassis, a motor, a ground engaging mechanism driven by the motor, an energy source configured to provide power to the motor, and a controller configured to control the motor. The method includes observing a torque of the motor based on an acceleration rate of the motor and determining a loss torque of the motor based on a deceleration rate of the motor. The method further includes calculating an actual torque output of the motor based on the loss torque and the observed torque.

According to another embodiment of the present disclosure, a vehicle is provided including a chassis, a ground engaging mechanism configured to support the chassis, an electric motor configured to drive the ground engaging mechanism, a power source configured to provide power to the electric motor, and a sensor configured to detect a speed of the electric motor. The vehicle further includes a controller configured to control the electric motor and to monitor the speed of the motor based on the sensor. The controller is configured to determine a loss torque of the motor based on a deceleration rate of the motor and to determine a torque output of the motor based on an acceleration rate of the motor and the loss torque of the motor.

BRIEF DESCRIPTION OF THE DRAWINGS

The above-mentioned and other features and advantages of the invention, and the manner of attaining them, will become more apparent and the disclosure itself will be better understood by reference to the following description taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

The embodiments disclosed herein are not intended to be exhaustive or to limit the disclosure to the precise forms disclosed in the following detailed description. Rather, the embodiments are chosen and described so that others skilled in the art may utilize their teachings.

Figure 1:
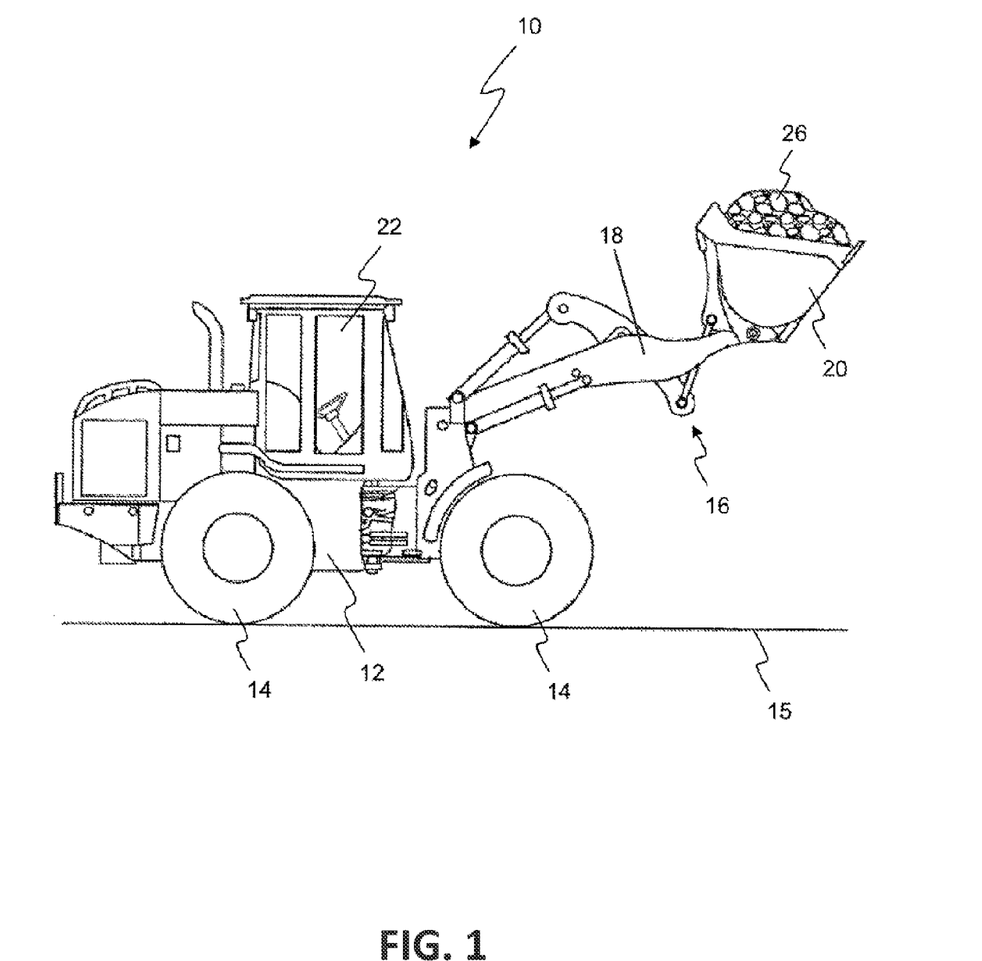
FIG. 1 illustrates an exemplary vehicle incorporating the motor diagnostic system of the present disclosure.

Referring to FIG. 1, an exemplary utility vehicle in the form of a loader 10 is provided. Although the utility vehicle is illustrated and described herein as loader 10, the utility vehicle 10 may include a motor grader, a tractor, a bulldozer, a feller buncher, a crawler, an excavator, a skidder, a forwarder, or another utility vehicle. Loader 10 includes a chassis 12 and a ground engaging mechanism or ground drive element 14. Ground engaging mechanism 14 is capable of supporting chassis 12 and propelling chassis 12 across the ground 15. Although the illustrated loader 10 includes wheels as ground engaging mechanism 14, loader 10 may include other ground engaging mechanisms, such as steel tracks, rubber tracks, or other suitable ground engaging members.

Loader 10 further includes a loader assembly 16. As illustrated in FIG. 1, loader assembly 16 includes a loader boom 18 and a work tool 20 in the form of a bucket. Work tool 20 may be capable of moving, excavating, plowing, or performing other material handling functions on a load 26, such as dirt or other materials. Other suitable work tools include, for example, blades, pallet forks, bale lifts, augers, harvesters, tillers, mowers, and grapples. Loader boom 18 is configured to move relative to chassis 12 to move and operate work tool 20. An operator controls the functions of loader 10, including ground engaging mechanism 14 and loader assembly 16, from an operator station 22 supported by chassis 12.

Figure 2:
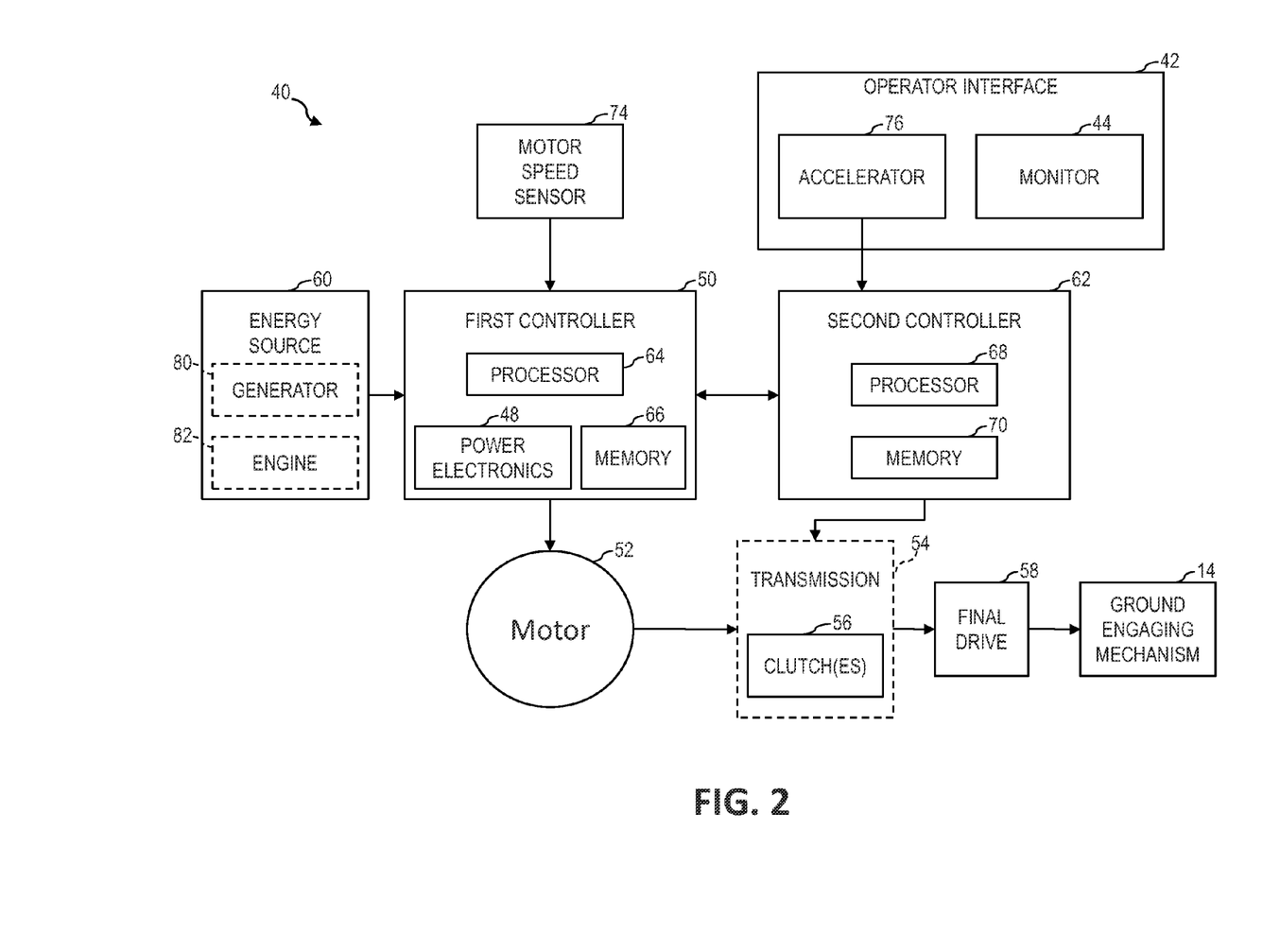
FIG. 2 illustrates a representative view of an exemplary electric drive system of the vehicle of FIG. 1 including a motor.

Referring to FIG. 2, an exemplary electric drive system 40 of vehicle 10 is illustrated. Drive system 40 includes an electric motor 52 configured to drive one or more ground engaging mechanisms 14. In one embodiment, motor 52 is a permanent magnet alternating current (PMAC) motor. Motor 52 may alternatively be a direct current motor or another suitable motor, such as a switched reluctance motor or an induction motor. Vehicle 10 may include additional motors 52 for driving ground engaging mechanisms 14. In one embodiment, vehicle 10 includes several motors 52, and each motor 52 independently drives a ground engaging mechanism 14. In one embodiment, electric drive system 40 includes a transmission 54 coupled between motor 52 and a final drive 58/ground engaging mechanism 14, as illustrated in FIG. 2. Alternatively, motor 52 may be coupled directly to final drive 58 and ground engaging mechanism 14.

Drive system 40 illustratively includes a first controller 50 and a second controller 62. In the illustrated embodiment, first controller 50 is a motor controller 50 configured to control electric motor 52 based on detected vehicle parameters and user input. For example, motor controller 50, which includes a processor 64 and software stored in a memory 66, may control the torque output of motor 52 based on input received from an accelerator 76, a motor speed sensor 74, and/or second controller 62.

Second controller 62 is illustratively a transmission or vehicle controller 62 in communication with motor controller 50 and an operator interface 42. Second controller 62 is configured to control transmission 54, although motor controller 50 or another controller may alternatively be used. Second controller 62, which includes a processor 68 and software stored in a memory 70, receives user input and various vehicle parameters for controlling transmission 54 and for issuing electric machine commands to controller 50 for controlling motor 52. Motor controller 50 provides vehicle parameters, such as electric machine speed feedback, to second controller 62. In one embodiment, transmission 54 includes a speed sensor providing transmission speed feedback to second controller 62. In one embodiment, second controller 62 is configured to coordinate a motor diagnostic test, as described herein. The functionalities of first and second controllers 50, 62 may alternatively be provided in a single controller or other controller configurations.

Operator interface 42 provides an operator with inputs, feedback, and controls for vehicle 10. For example, operator interface 42 may include a steering device, a brake, a transmission shifter, and other input devices. Operator interface 42 illustratively includes accelerator 76 for controlling the speed or torque of motor 52. In one embodiment, accelerator 76 includes a pedal or lever or other suitable input device having a position sensor providing position feedback to controller 50. Operator interface 42 may include a display providing various vehicle parameters such as vehicle speed, ground speed, and other parameters to an operator. In the illustrated embodiment, operator interface 42 includes a monitor 44 for displaying diagnostic information received from first and second controllers 50, 62. In one embodiment, vehicle 10 may further include a vehicle control unit (VCU) coupled to first and second controllers 50, 62 for driving the operator interface 42. For example, the VCU may provide vehicle speed, transmission gear data, vehicle temperature data, and other vehicle parameters to the operator via monitor 44. In one embodiment, the VCU routes the operator inputs received from operator interface 42 to the appropriate controller 50, 62.

Drive system 40 further includes an energy source 60 configured to provide power to motor 52. In one embodiment, energy source 60 includes a generator 80 driven by a combustion engine 82, as illustrated in FIG. 2. Energy source 60 may alternatively or additionally include a battery, a series of capacitors, a fuel cell, or another suitable source of electrical power for driving motor 52. Motor controller 50 is configured to control and monitor generator 80, for example, to control energy generation at a particular voltage or power level. In one embodiment, motor controller 50 includes multiple control units with individual processors for controlling each electric machine of vehicle 10, illustratively generator 80 and motor 52. Controller 50 illustratively includes power electronics 48 configured to selectively route power from energy source 60 to motor 52 for driving motor 52. For example, power electronics 48 may include power semiconductors, such as internal gate bipolar transistors (IGBT's), controlled by software stored in memory 66 of controller 50. In one embodiment, power electronics 48 are configured to provide rectified power from a generator of energy source 60 to a direct current (DC) link of controller 50 and to provide inverted power from the DC link to motor 52.

In one embodiment, motor 52 is selectively coupled to ground engaging mechanism 14. Transmission 54 includes at least one clutch 56 configured to engage the transmission 54 and to couple motor 52 to final drive 58 or to ground engaging mechanism 14. Disengagement of clutch 56 decouples motor 52 from final drive 58. In the illustrated embodiment, second controller 52 is configured to control engagement of clutch 56, although controller 50 may alternately be used. In one embodiment, transmission 56 is a power shift transmission with three clutches 56 corresponding to three transmission gears, although other configurations may be provided. Other suitable devices configured to selectively couple motor 52 to ground engaging mechanism 14 may be provided. In a selectively coupled configuration, final drive 58 includes one or more drive shafts coupled to transmission 54 and to ground engaging mechanisms 14.

In one embodiment, motor 52 is fixedly coupled to final drive 58 and ground engaging mechanism 14. For example, in this configuration, vehicle 10 does not include a transmission 54, and motor 52 is coupled directly to final drive 58 or to ground engaging mechanism 14. Accordingly, motor 52 is not configured to disengage from final drive 58 or from ground engaging mechanism 14 upon command by controller 62. In a fixedly coupled configuration, final drive 58 includes a gear box configured to provide a speed reduction from motor 52 to ground engaging mechanism 34.

Motor speed sensor 74 is configured to detect a rotational speed of an output shaft of motor 52. Speed sensor 74 may alternatively be coupled to ground engaging mechanism 14 or to another motor-driven component of the drive train. In one embodiment, speed sensor 74 includes a position sensor, such as a resolver or an encoder, coupled to motor 52 for providing motor position feedback to controller 50. Using the position feedback from sensor 74, controller 50 determines the rotational speed of motor 52 and provides the motor speed feedback to second controller 62. In one embodiment, a second speed sensor is coupled to an output of transmission 54 or to a component of final drive 58 and provides speed feedback to one of controllers 50, 62.

In the illustrated embodiment, motor controller 50 is configured to sample the motor speed feedback provided with speed sensor 74 at predetermined intervals or increments. In one embodiment, controller 50 calculates the detected motor speed at intervals of about 500 microseconds (μs). Other sampling rates may be used depending on the level of accuracy needed in the motor speed calculation. For example, sampling intervals of 250 μs or 1 millisecond (ms) may also be used. In the illustrated embodiment, the calculated motor speed is used in a motor performance diagnosis test, as described herein. In one embodiment, a shorter speed sampling interval provides greater accuracy in the motor performance diagnosis.

In the illustrated embodiment, drive system 40 is configured to diagnose the output performance of motor 52. Controllers 50, 62 cooperate to estimate the observed torque output of motor 52 based on the acceleration rate of motor 52, as described herein and illustrated in FIG. 3. Further, controllers 50, 62 cooperate to estimate the loss torque of the drive system 40 based on the deceleration rate of motor 52. For example, motor 52 experiences a loss of torque due to windage and drag of motor 52 and components coupled to motor 52. The actual torque of motor 52 is calculated based on the difference between the observed torque output and the loss torque.

In the illustrated embodiment, the moments of inertia of motor 52 and of drive train components rotationally coupled to motor 52 are determined and are employed in the torque calculation. Drive train components downstream of motor 52 may affect the torque observed at the output of motor 52. For example, in a vehicle 10 not including transmission 54, the drive train components downstream of motor 52 may include the output shaft of motor 52, components of final drive 58 (for example, gear box, drive axle, etc.), and components of ground engaging mechanism 14 (for example, the wheel, tire, and other components). In a vehicle 10 including transmission 54, motor 52 may be decoupled from final drive 58 upon disengaging clutch 56 of transmission 54. As such, drive train components rotationally coupled to motor 52 may include the output shaft of motor 52 and any components positioned between the output shaft of motor 52 and clutch 56 of transmission 54.

The combined moment of inertia of motor 52 and all rotationally coupled components of interest is represented as:

$$I_{combined} = I_{motor} + I_1 \left(\frac{w_2}{w_{motor}}\right)^2 + \ldots + I_n \left(\frac{w_n}{w_{motor}}\right)^2 \quad (1)$$

wherein $I_{combined}$ is the total moment of inertia of motor 52 and of components rotationally coupled to motor 52, $I_{motor}$ is the moment of inertia of motor 52, $I_1$ through $I_n$ are the moments of inertia of the drive train components rotationally coupled to motor 52, $w_{motor}$ is the angular velocity of motor 52, and $w_1$ through $w_n$ are the angular velocities of the drive train components rotationally coupled to motor 52. The angular velocity of motor ($w_{motor}$) is calculated based on feedback from motor speed sensor 74. The angular velocities $w_1$ through $w_n$ are determined based on the measured angular velocity of motor ($w_{motor}$) and the known physical relationship between motor 52 and the corresponding rotationally coupled component.

The moments of inertia $I_{motor}$ and $I_1$ through $I_n$ are known physical quantities based on the mass and dimensions of the corresponding component. In one embodiment, these moments of inertia are provided in manufacturer specifications or are determined based on the mass and dimensions of the component. In one embodiment, the moments of inertia are stored in memory 70 of second controller 62. The moments of inertia may also be stored in memory 66 of motor controller 50 or in another controller or may be entered into operator interface 42 prior to performing the motor performance test.

Figure 3:
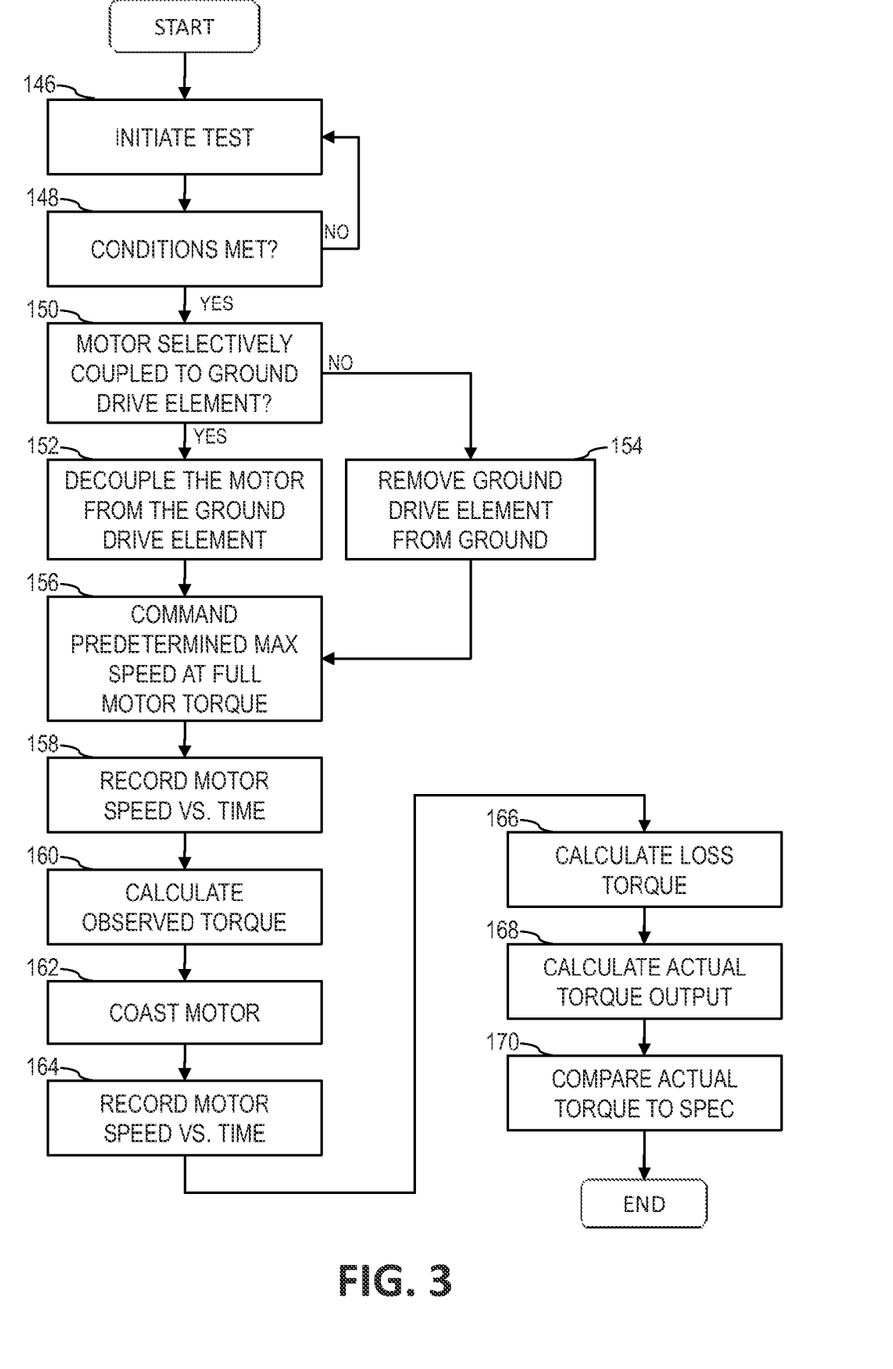
FIG. 3 illustrates an exemplary motor diagnostic method of the vehicle of FIG. 1.

Referring to FIG. 3, an exemplary method of diagnosing the torque output performance of motor 52 is illustrated. At block 146, the motor output performance test is initiated by an operator. For example, the operator may select an input at operator interface 42 configured to initiate the motor performance test. Upon initiation, second controller 62 checks to confirm that all conditions are met before running the test, as represented at block 148. For example, exemplary conditions include vehicle 10 being stopped or in park, a parking brake being engaged, and motor 52 and/or the transmission fluid being at a certain temperature. In one embodiment, for a vehicle 10 with motor 52 fixedly coupled to final drive 58, ground engaging mechanism 14 is required to be removed from contact with the ground, as described herein, before controller 62 allows the performance test to continue. Upon confirming the conditions are met, controller 62 initiates the test.

Referring to blocks 150 and 152, if motor 52 is selectively coupled to ground engaging mechanism 14, motor 52 is disengaged from the ground engaging mechanism 14. In the illustrated embodiment, controller 62 disengages clutch 56 of transmission 54 to decouple motor 52 from ground engaging mechanism 14. If motor 52 is fixedly coupled to ground engaging mechanism 14 or final drive 58, the ground engaging mechanism 14 driven by motor 52 is removed from contact with the ground, as represented at block 154. For example, referring to FIG. 1, if motor 52 drives two front wheels 14 of vehicle 10, the front end of vehicle 10 is lifted from ground 15 to remove the front wheels 14 from contact with ground 15. In one embodiment, loader assembly 16 may be manipulated to engage the ground 15 to push the front of vehicle 10 away from ground 15. Alternatively, a jacking device or other suitable device or system may be used to lift the driven wheels from ground 15. Similarly, if motor 52 drives the rear wheels 14 of vehicle 10, the rear portion of vehicle 10 may be lifted from ground 15. In one embodiment, controller 62 determines the driven ground engaging mechanisms 14 of vehicle 10 are removed from the ground 15 based on feedback from a sensor. For example, a suspension or load sensor may be used to detect a no load condition on the driven ground engaging mechanisms 14, although other sensors may be used to detect the position of ground engaging mechanisms 14 relative to the ground 15.

Removing the driven ground engaging mechanisms 14 from engagement with the ground 15 allows vehicle 10 to remain stationary when torque is applied to the ground engaging mechanisms 14 during the motor performance test. As such, the moving inertia of vehicle 10 may be removed from consideration in analyzing the torque output of motor 52. In the illustrated embodiment, the inertia of the ground engaging mechanism 14, final drive 58, and other components downstream of motor 52 are considered in calculating the torque output of motor 52, as described herein.

At block 156, from a zero speed condition of motor 52, controller 62 commands full motor torque, i.e., accelerates motor 52 at a maximum rate, until motor 52 reaches a predetermined maximum speed or angular velocity $w_{max}$. In one embodiment, the predetermined maximum speed $w_{max}$ is based on the design specifications and capabilities of motor 52. In one embodiment, the predetermined maximum speed $w_{max}$ is about 630 radians per second (rad/s), although other maximum speeds may be implemented. In the illustrated embodiment, the torque command is provided by second controller 62 to controller 50, which implements the torque command by controlling the power provided to motor 52 from energy source 60.

During the acceleration from zero speed to maximum speed $w_{max}$, controller 62 records the speed of motor 52 versus time, i.e., the acceleration rate of motor 52, as represented at block 158. In the illustrated embodiment, controller 62 samples the motor speed at predetermined sampling intervals, as described herein, over the time of acceleration of motor 52. In one embodiment, controller 62 samples the motor speed at intervals of about 500 μs.

Based on the acceleration rate of motor 52 calculated at block 158, an observed torque of motor 52 as a function of the motor speed is determined and stored, as represented at block 160. The instantaneous observed torque of motor 52 at a given angular velocity is represented as:

$$\tau_{observed, wj} = I_{combined} \alpha_{wj} = I_{combined} \frac{\Delta w}{\Delta t} \quad (2)$$

wherein $\tau_{observed, \omega j}$ is the instantaneous observed torque of motor 52 at an angular velocity j, $\alpha_{\omega j}$ is the angular acceleration rate at angular velocity j, $\Delta t$ is a measurement period, and $\Delta \omega$ is the change in angular velocity over the measurement period $\Delta t$. Controller 62 determines the acceleration rate $\Delta \omega / \Delta t$ at block 158, and the total rotational moment of inertia $I_{combined}$ is determined with Equation 1 above. As such, the instantaneous observed torque is determined and recorded for each sampled motor speed over the period of acceleration of motor 52.

At block 162, with motor 52 at the predetermined maximum speed $w_{max}$, zero torque command is provided to motor 52, and motor 52 is allowed to coast until it reaches zero angular velocity. The motor speed is monitored during the deceleration of motor 52. Based on the monitored motor speed provided with motor speed sensor 74 and controller 50, controller 62 calculates and stores in memory 70 the coasting motor speed as a function of time, i.e., the deceleration rate of motor 52, as represented at block 164. In the illustrated embodiment, controller 62 samples the motor speed at predetermined sampling intervals, as described herein, over the time of deceleration of motor 52. In the illustrated embodiment, controller 62 samples the motor speed at the same sampling intervals used in the observed torque calculation at block 160. In one embodiment, controller 62 samples the motor speed at intervals of about 500 μs.

Figure 4:
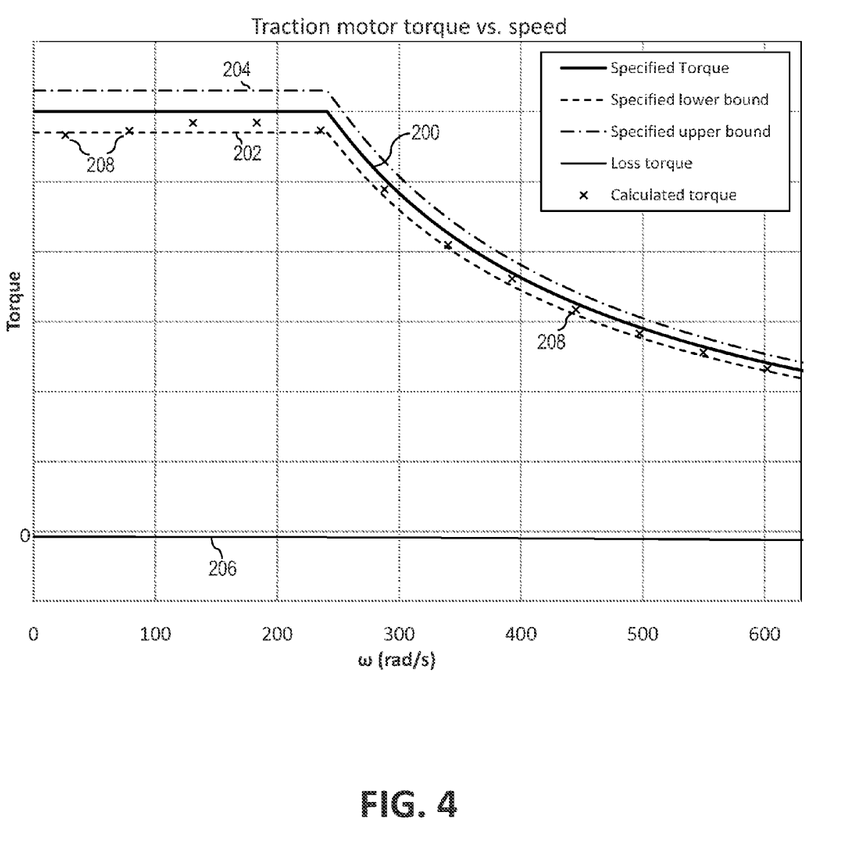
FIG. 4 illustrates an exemplary torque output of the motor of FIG. 2 as a function of motor speed.

Based on the deceleration rate of motor 52 calculated at block 164, a torque loss of motor 52 as a function of the motor speed is determined and recorded, as represented at block 166. The instantaneous torque loss of motor 52 at a given angular velocity may be represented as:

$$\tau_{loss,wj} = I_{combined} \alpha_{wj} \quad (3)$$

$$\tau_{loss,wj} = I_{combined} \frac{\Delta w}{\Delta t} \quad (4)$$

wherein $\tau_{loss,\omega j}$ is the instantaneous torque loss of motor 52 at an angular velocity j, $\alpha_{\omega j}$ is the angular deceleration rate at angular velocity j, $\Delta t$ is a measurement period, and $\Delta \omega$ is the change in angular velocity of motor 52 over the measurement period $\Delta t$. Controller 62 determines the deceleration rate $\Delta \omega / \Delta t$ at block 164, and $I_{combined}$ is determined with Equation 1 above. For example, $\Delta \omega / \Delta t$ is the change in motor speed over a sampling interval of 500 μs. As such, the instantaneous torque loss is determined and stored for each sampled motor speed over the period of deceleration of motor 52. See, for example, exemplary loss torque curve 206 illustrated in FIG. 4 and described herein. In the illustrated embodiment, the resulting torque loss $\tau_{loss,\omega j}$ of Equations (3) and (4) is a negative value due to the deceleration of motor 52.

At block 168, an actual torque output of motor 52 is calculated based on a difference between the observed torque $\tau_{observed,\omega j}$ and the torque loss $\tau_{loss,\omega j}$. In particular, the actual instantaneous torque of motor 52 at a given angular velocity is represented as:

$$\tau_{actual,wj} = \tau_{observed,wj} - \tau loss,wj \quad (5)$$

wherein $\tau_{actual,\omega j}$ is the actual instantaneous torque of motor 52 at angular velocity j, $\tau_{observed,\omega j}$ is the instantaneous observed torque of motor 52 calculated with Equation (2), and $\tau_{loss,\omega j}$ is the instantaneous torque loss of motor 52 calculated with Equation (4). As such, the actual instantaneous torque is determined and recorded for each sampled motor speed between zero speed and maximum speed $w_{max}$ of motor 52. See, for example, exemplary actual instantaneous torque plots 208 illustrated in FIG. 4 and described herein. Because the torque loss $\tau_{loss,\omega j}$ is a negative value, Equation (5) may be rewritten as the sum of the magnitudes of the observed torque $\tau_{observed,\omega j}$ and the loss torque $\tau_{loss,am}$.

At block 170, the actual instantaneous torque is compared to a specified motor torque over the range of motor speeds to determine if the actual torque of motor 52 is within the specification tolerance (η) of motor 52, as represented by:

$$\eta_{(-)} \tau_{specified,wj} \leq \tau_{actual,wj} \leq \eta_{(+)} \tau_{specified,wj} \quad (6)$$

wherein $\eta_{(-)} \tau_{specified,\omega j}$ is the lower torque baseline or threshold of motor 52 and $\eta_{(+)} \tau_{specified,\omega j}$ is the upper torque baseline or threshold of motor 52. In one embodiment, the torque range or tolerance (η) between $\eta_{(-)} \tau_{specified,\omega j}$ and $\eta_{(+)} \tau_{specified,\omega j}$ is based on the design specifications of motor 52. In one embodiment, the specified torque range (η) includes torque values falling within about 5% of the specified or rated torque of motor 52, although any suitable torque range may be provided. See, for example, exemplary specified torque curve 200, exemplary specified lower bound curve 202, and exemplary specified upper bound curve 204.

In one embodiment, the motor performance test calculates the loss torque of motor 52 first followed by the observed torque calculation. In this embodiment, referring to FIG. 3, the steps illustrated in blocks 162, 164, and 166 are performed prior to performing the steps illustrated in blocks 158 and 160. In particular, motor 52 is accelerated to the maximum speed $w_{max}$ in block 156 at a maximum torque or any other suitable torque or acceleration rate. After reaching the maximum speed $w_{max}$ at block 156, motor 52 is coasted and the motor deceleration rate and torque loss are calculated (blocks 162, 164, 166). With motor 52 at a zero speed condition, motor 52 is again accelerated to the maximum speed at a full motor torque, and the acceleration rate and observed torque are calculated (blocks 158, 160).

The observed torque and the loss torque may be calculated at other suitable stages of the motor performance test. For example, in one embodiment, the observed torque and the loss torque are calculated after determining both the acceleration rate (blocks 156, 158) and the deceleration rate (blocks 162, 164) of motor 52.

In one embodiment, other speed ranges are used in the motor performance test. For example, motor 52 may be accelerated from a non-zero speed to the maximum speed (or to another speed) at block 156, and decelerated from the maximum speed to the non-zero speed at block 162.

In the illustrated embodiment, motor 52 "passes" or "fails" the motor performance test of FIG. 3 based on whether the actual calculated torque falls within the specification torque range (η) of motor 52 for the sampled angular velocities. In one embodiment, motor 52 fails the performance test if the calculated actual torque falls outside the acceptable torque range (η) at any sampled motor speed. In one embodiment, motor 52 fails the performance test depending on the frequency that the calculated actual torque falls outside the acceptable torque range (η) and the extent of deviation from the acceptable torque range (η). In one embodiment, controller 62 provides status and progress feedback to operator interface 42 during the test for observation by an operator. Controller 62 may also provide the results of the motor performance test to operator interface 42. In one embodiment, controller 62 provides a pass/fail indication to operator interface 42 based on the comparison of the actual motor torque to the upper and lower predetermined torque thresholds. In one embodiment, controller 62 provides an audio or a visual indication to the operator upon motor 52 falling outside the specified torque range.

In the illustrated embodiment, controller 50 and controller 62 cooperate to perform many of the steps of the method illustrated in FIG. 3. In the illustrated embodiment, motor controller 50 provides speed and acceleration data to controller 62, and controller 62 analyzes the data to perform the motor torque calculations. Other combinations of controllers may be used to share information and to implement the performance test of FIG. 3.

Referring to FIG. 4, a plot is provided illustrating exemplary motor torque output of motor 52 over a range of motor speeds. Specified torque curve 200 illustrates an expected torque output of motor 52 based on design specifications. In other words, specified torque curve 200 represents the target maximum torque output of motor 52 over the illustrated range of motor speeds. In the illustrated embodiment, the lower bound of the specified torque is illustrated with curve 202 and the upper bound of the specified torque is illustrated with curve 204. Lower and upper bound curves 202 and 204 illustratively provide a "pass" band of 95% to 105% of the specified torque. Other pass bands may be provided, such as 90% to 110% of the specified torque, for example. As illustrated, the specified torque of motor 52 is at a maximum for motor speeds between zero and about 240 rad/s, i.e., the "constant torque region" of motor 52. For motor speeds greater than about 240 rad/s, the target or specified torque of motor 52 decreases along a substantially parabolic curve. At a maximum speed of about 630 rad/s, the specified torque is illustratively approaching about one-third of the maximum torque output of the constant torque region.

In the exemplary motor performance test of FIG. 4, the speed sampling intervals are about 500 microseconds, and the torque calculation intervals are about 50 rad/s. Other speed sampling or torque calculation intervals may be used to provide further resolution or sensitivity. For example, torque calculation intervals of 10 rad/s, 50 rad/s, or 100 rad/s may also be used. Further, the pass band illustratively includes torque values falling within 5% of the specified torque 200. Loss torque curve 206, shown as a negative curve, indicates a loss torque for the illustrated range of motor speeds. The loss torque illustratively increases as the motor speeds increase.

The calculated actual torque 208 of motor 52 illustratively ranges from about 92% to 102% of the specified torque 200. In a constant torque region including motor speeds between zero and about 240 rad/s, the actual torque output of motor 52 is higher than for speeds outside the constant torque region. For motor speeds greater than 240 rad/s, the actual torque output of motor 52 decreases and substantially follows the specified torque curve 200. With the exception of the first torque plot 208 at about 25 rad/s, the calculated torque plots 208 of FIG. 4 illustrate that the actual torque of motor 52 substantially falls within the specified torque range defined by lower and upper torque curves 202, 204.

In another exemplary method of testing motor output torque performance, stall torque of motor 52 is analyzed. In one embodiment, vehicle 10 includes an electro-hydraulic solenoid configured to output oil or another fluid to engage clutch 56 of transmission 54 based on current commands provided with second controller 62. For a given current command to the electro-hydraulic solenoid, the corresponding pressure applied between clutch plates is determined. Based on the geometry of clutch 56 and the determined clutch pressure, the amount of torque that clutch 56 is able to withstand prior to clutch slip is determined.

In the stall torque method, clutch 56 is engaged with the hydroelectric solenoid. Full motor torque is commanded against the engaged clutch 56. Clutch 56 is slowly demodulated until slip is observed at clutch 56. The torque output of motor 52 is determined based on the point at which clutch 56 slips. The determined torque output is compared to specification to analyze the performance of motor 52.

In another exemplary stall torque method, the slipping point of clutch 56 is determined based on the specification maximum torque of motor 52. Clutch 56 is set to the determined slipping point, and a maximum torque command is provided to motor 52. Motor 52 passes this torque performance test if clutch 56 is caused to slip from the maximum torque command. If clutch 56 does not slip, motor 52 fails the test because motor 52 failed to produce enough torque to cause clutch 56 to slip despite the maximum torque command.

Factors considered in the stall torque test include the input current to the solenoid versus the output oil pressure, the piston area or volume of clutch 56, the effective radius of clutch 56, the number of friction surfaces of clutch 56, and the static coefficient of friction of the friction surfaces of clutch 56. In one embodiment, the coefficient of friction of clutch 56 ranges from about 0.08 to about 0.11.

In another exemplary method of testing motor output torque performance, motor power consumption is estimated above a threshold motor speed or base speed of motor 52. The power output of motor 52 increases as the motor speed increases to the base speed. At speeds greater than the base speed, the power output of motor 52 remains substantially constant. At the base speed, the torque and the power output of motor 52 are at maximum levels. Referring to FIG. 4, for example, the constant or high power region of motor 52 is at motor speeds above the base speed of about 240 rad/s. In this motor performance test, the power output from energy source 60 is measured when motor 52 is operating in the constant power region. Subtracting known power losses between the output of energy source 60 and the input of motor 52 from the measured power output of energy source 60, the power consumption of motor 52 is estimated for sampled speeds above the base speed. Based on the estimated motor power consumption and the sampled motor speeds, the torque output of motor 52 is determined.

In another exemplary method of testing motor output torque performance, the power consumption of motor 52 is estimated with power electronics 48 of controller 50. In one embodiment, controller 50 includes current sensors at power electronics 48 configured to measure the current input provided with energy source 60. In one embodiment, at least two current sensors are provided to measure three-phase current input. The voltage at power electronics 48 is also determined from actual measurements with voltage sensors or based on an estimate using the measured current. In one embodiment, a Park transformation is implemented to calculate the quadrature and direct axis current and voltage values. Based on the measured currents and voltages through power electronics 48, the power consumption of motor 52 is estimated. Based on the estimated motor power consumption and the sampled motor speeds, the torque output of motor 52 is determined.

While the sensor diagnostic system is described in conjunction with a utility vehicle, the system may also be used on any electric vehicle or electrical system having at least one motor.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

The invention claimed is:

1. A method of diagnosing motor performance of a vehicle, the method including:
   providing a vehicle including a chassis, a motor having an output, a ground engaging mechanism driven by the motor, an energy source configured to provide power to the motor, and a controller configured to control the motor;

determining an observed torque of the motor based on an acceleration rate of the output of the motor;

determining a loss torque of the motor based on a deceleration rate of the output of the motor; and calculating an actual torque output of the motor based on the loss torque and the observed torque.

2. The method of claim 1, wherein the actual torque output of the motor is based on a sum of the magnitudes of the loss torque and the observed torque.

3. The method of claim 1, further including commanding a substantially maximum torque to the motor to accelerate the motor from a substantially zero speed to a predetermined maximum speed, wherein the determining the observed torque includes monitoring the speed of the output of the motor as the output of the motor accelerates from the substantially zero speed to the predetermined maximum speed.

4. The method of claim 3, wherein the determining the loss torque includes coasting the output of the motor from the predetermined maximum speed to the substantially zero speed and monitoring a speed of the output of the motor as the output of the motor decelerates from the predetermined maximum speed to the substantially zero speed, the coasting including commanding substantially zero torque to the motor.

5. The method of claim 4, wherein the speed of the output of the motor is sampled at predetermined intervals during the determining the loss torque and the determining the observed torque.

6. The method of claim 1, further including identifying a moment of inertia of at least the motor, the loss torque being determined based on a monitored speed during a deceleration of the output of the motor and the moment of inertia of the at least the motor, the observed torque being determined based on a monitored speed during an acceleration of the output of the motor and the moment of inertia of the at least the motor.

7. The method of claim 6, the vehicle further including at least one drive train component rotationally coupled to the output of the motor, wherein the identifying includes identifying the moment of inertia for the motor and the at least one drive train component rotationally coupled to the motor.

8. The method of claim 1, further including at least one of removing the ground engaging mechanism from a contact with the ground and decoupling the output of the motor from the ground engaging mechanism.

9. The method of claim 8, the vehicle further including a transmission coupled between the output of the motor and the ground engaging mechanism, the transmission including a clutch, wherein the decoupling includes disengaging the clutch of the transmission.

10. The method of claim 1, further including comparing the actual torque output to a threshold torque range to determine an output performance of the motor.

11. A vehicle including:
a chassis;
a ground engaging mechanism configured to support the chassis;
an electric motor including an output configured to drive the ground engaging mechanism;
a power source configured to provide power to the electric motor;
a sensor configured to detect a speed of the output of the electric motor; and
a controller configured to control the electric motor and to monitor the speed of the output of the motor based on the sensor, the controller being configured to determine a loss torque of the motor based on a deceleration rate of the output of the motor, the controller being configured to determine a torque output of the motor based on an acceleration rate of the output of the motor and the loss torque of the motor.

12. The vehicle of claim 11, wherein the deceleration rate is based on the monitored speed of the output of the motor as the output of the motor decelerates from a predetermined maximum speed to a substantially zero speed, and the acceleration rate is based on the monitored speed of the output of the motor as the output of the motor accelerates from the substantially zero speed to the predetermined maximum speed.

13. The vehicle of claim 11, wherein the controller is configured to determine an observed torque of the motor based on the acceleration rate, and the torque output of the motor is the sum of the magnitudes of the observed torque and the loss torque.

14. The vehicle of claim 11, wherein the loss torque and the torque output are further based on a moment of inertia of at least the motor.

15. The vehicle of claim 14, further including at least one drive train component coupled to the motor, the loss torque and the torque output being based on the moment of inertia of the motor and the at least one drive train component coupled to the motor.

16. The vehicle of claim 15, wherein the at least one drive train component includes a final drive coupled between the output of the motor and the ground engaging mechanism, wherein the motor is fixedly coupled to the final drive, the final drive including at least one drive shaft.

17. The vehicle of claim 12, further including a transmission coupled between the output of the motor and the ground engaging mechanism, the transmission including a clutch, the clutch being disengaged during the deceleration of the output of the motor from the predetermined maximum speed to the substantially zero speed and during the acceleration of the output of the motor from the substantially zero speed to the predetermined maximum speed.

18. The vehicle of claim 12, wherein the controller is configured to command substantially maximum torque to the motor to accelerate the output of the motor from the substantially zero speed to the predetermined maximum speed.

19. The vehicle of claim 11, the controller being configured to detect an output performance of the motor based on a comparison of the torque output to a specified torque range of the motor.

20. The vehicle of claim 19, wherein the controller is configured to provide an indication to an operator of the vehicle upon the torque output of the motor falling outside the specified torque range of the motor, the indication including at least one of an audio indication and a visual indication.

* * * * *